UNITED STATES PATENT OFFICE.

FARNHAM MAXWELL LYTE, OF LONDON, COUNTY OF MIDDLESEX, ENGLAND, ASSIGNOR TO THE ELECTRIC CAR COMPANY OF AMERICA, OF PHILADELPHIA, PENNSYLVANIA.

ELECTRODE FOR SECONDARY BATTERIES.

SPECIFICATION forming part of Letters Patent No. 422,308, dated February 25, 1890.

Original application filed January 7, 1889, Serial No. 295,677. Divided and this application filed September 25, 1889. Serial No. 325,072. (No model.) Patented in England July 13, 1883, No. 3,452.

*To all whom it may concern:*

Be it known that I, FARNHAM MAXWELL LYTE, of the city of London, county of Middlesex, England, have invented an Improvement in Secondary Batteries, (for which I have received Letters Patent in England July 13, 1883, No. 3,452,) of which the following is a specification.

My invention has reference to secondary batteries; and it consists of certain improvements, which are fully set forth in the following specification and shown in the accompanying drawings, which form a part thereof.

This application is for an invention disclosed in British Letters Patent No. 3,452, granted to me on July 13, 1883, and is a division of my application, Serial No. 295,677, filed January 7, 1889.

This invention relates to secondary batteries or accumulators; and it consists in the peculiar construction of the electrodes, as hereinafter described.

According to my invention I construct a battery in which the active material of the electrode is formed by compressing into a mold or otherwise either chloride or any equivalent salt of lead—such as the nitrate—mixed or not with oxide of lead, or by fusing chloride of lead or equivalent salt of lead, mixed or not with oxide of lead, and running the same into a mold of the proper shape, and then removing the mass from the mold and reducing it by contact with metallic zinc in salt and water, or by electrolysis, to the state of coherent spongy lead. If desired, the fused lead chloride or other salts of lead soluble in water and insoluble in sulphuric acid, mixed or not with lead oxide, and whether or not they have been agglomerated in a mold without being fused and mixed with lead oxide, may be secured in or to or form the supporting-plates before being reduced, and be reduced therein or thereon to a state of spongy lead. If desired, I may use any other equivalent form of finely-divided lead, and I may form the electrode by compressing the active material into the desired form with or without the employment of a grid or metal frame. It will thus be seen that in making the active material for my electrode I employ a salt of lead which is insoluble in the electrolytic fluid, (sulphuric acid diluted,) and yet soluble in water to a more or less degree, and mix it with the oxide of lead, or, if desired, any finely-divided form of metallic lead. The mixture is made into a paste and then compressed into the desired form, and when dry may be immersed in the electrolytic fluid and formed. The active material so molded may be used by having a series of such molded pieces held or bound together by casting a lead frame around them, as set out in my application of which this is a division. There are in addition to the chloride quite a number of salts or compounds of lead which are insoluble in sulphuric acid, (such, for instance, as nitrate of lead or sodium plumbate, which are chemical equivalents of the chloride of lead in this connection,) and all of which are soluble in water. The mixture of these salts with the lead oxide and water enables the plastic active material thus produced to be molded or shaped as desired, and then dried for the purpose of crystallizing the said salts in intimate contact with the oxide of lead or metallic lead which it holds in a firm condition, and enables rapid forming without disintegration when the electrode is placed in sulphuric acid and a strong electric current sent through it.

I do not confine myself to the mere details, as they may be varied without departing from the spirit of the invention.

Having now described my invention, what I claim as new, and desire to secure by Letters Patent, is—

1. An element or electrode for a secondary battery, consisting of a mixture of active material with a salt of lead which is soluble in water and insoluble in sulphuric acid.

2. Material to become active for use in a secondary battery, consisting of lead oxide with any soluble salt or compound of lead, as the chloride.

3. As a new article of manufacture, a secondary-battery electrode consisting of an intimate mixture of an oxide of lead and a salt of lead soluble in water and insoluble in sulphuric acid.

4. As a new article of manufacture, a secondary-battery electrode consisting of an oxide, salt, or compound of lead with a salt which when united forms a salt of lead insoluble in acid but soluble in water.

In testimony of which invention I hereunto set my hand.

FARNHAM MAXWELL LYTE.

Witnesses:
 CHAS. BERKLEY HARRIS,
  *Notary Public, London.*
 BEATRICE MAXWELL LYTE.